Dec. 2, 1969 A. F. DECKER 3,482,228
WRITE CIRCUIT FOR A PHASE MODULATION SYSTEM
Filed Oct. 21, 1965 2 Sheets-Sheet 1

INVENTOR
ALOYSIUS F. DECKER

BY Edward M. Fassell

ATTORNEY

Dec. 2, 1969 A. F. DECKER 3,482,228

WRITE CIRCUIT FOR A PHASE MODULATION SYSTEM

Filed Oct. 21, 1965

2 Sheets-Sheet 2

United States Patent Office 3,482,228

Patented Dec. 2, 1969

3,482,228

WRITE CIRCUIT FOR A PHASE MODULATION SYSTEM

Aloysius F. Decker, Yeadon, Pa., assignor to Sperry Rand Corporation, New York, N.Y., a corporation of Delaware Filed Oct. 21, 1965, Ser. No. 499,770
Int. Cl. G11b 5/00
U.S. Cl. 340—174.1 3 Claims

ABSTRACT OF THE DISCLOSURE

The present device provides a shift register into which three consecutive bits of information which are to be written magnetically on a magnetic recording medium are transmitted. The information is written according to a phase modulation principle whereby for instance binary ONE's are written by having the flux polarized in one direction and binary ZERO's are written by having the flux polarized in another direction. The present system provides a decoder to detect the significance of the three bits of information in the register, and when there is an information bit of one type, for instance a ONE, followed by two information bits of the other type, for instance ZERO's, the middle bit of information must be written at a later time than it would be written if the pattern had been a ONE followed by a ZERO and thereby a ONE, and in the alternative, the middle bit of information should be written at an earlier time if the pattern had been two bits of information of the same type, for instance ONE's followed by one bit of information of a different type, for instance ZERO.

Figure 1:
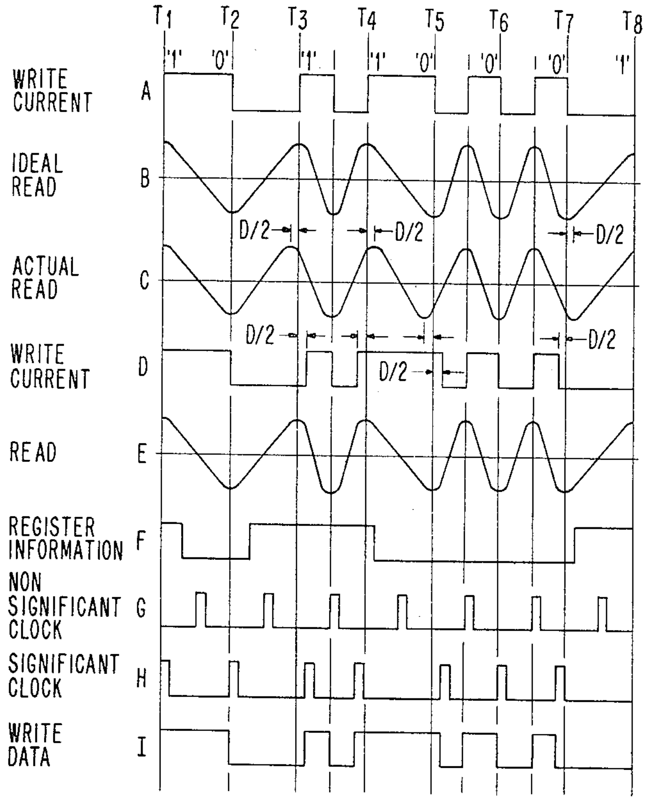

The system provides circuitry means to transfer the second bit or middle bit to the recording head after properly delaying its transmission thereto and further provides a feedback circuit from the output of the delay circuits to advance the shift register.

This invention relates to phase modulation systems, and more particularly to write circuits used in such systems.

Information in a digital magnetic recording is coded in binary notation. The unit of information is a bit, and its two possible values, one or zero, are directly associated with two states, or transitions between the two states of saturation magnetization in the recording medium.

There are many methods of recording the binary signal of which the most commonly used are Non-Return-to-Zero (NRZ, NRZ1, NRZ0) and Phase-Modulation (PM). In these methods, the information is carried in the form of transitions between the two magnetic states.

One of the principal figures of merit in magnetic recording is the bit density along the track expressed in bits per inch (b.p.i.). Thus, recording methods which allow for high density recording are of special interest.

In the so-called phase modulation system, information representing "1's" or "0's" are magnetically recorded on a drum or tape, for example. The recording medium is generally magnetized in one or the other direction dependent upon the type of information to be recorded. The recorded information may be considered as passing through zero when it passes from one state to the other state. The type of information, i.e., whether the information is a "1" or a "0," is generally determined by the direction of the recorded signal as it passes through the zero level.

For example, if it is desired to record a "1," the signal to be recorded or the write current may be at one level for one half of the digit period and at another level for the other half of the digit period. A "1," for example, may be designated when the signal is going from a negative to a positive direction when it passes through the zero reference level. Likewise, a "0" may be designated when a signal is passing from a high or positive level to a low or negative level when it passes through zero.

One of main advantages of a phase modulation system when it is used in computers, for example, is that since there is a signal at every bit time the actual readback signal may be used to generate various timing or clock signals when the information is read from recording mediums. This eliminates the need for recording timing signals. Another important feature of a phase modulation system is that it is generally possible to record a high amount of information in a limited space. Other systems such as the NRZ1 and NRZ0 also permit high amounts of information to be recorded.

One of the problems encountered in a phase modulation system, as well as other pulse recording systems, is that different types of information signals may tend to shift the phase of the recorded signals. Such a shifting of the phase of the recorded signals results in a situation in which the read out information signals will have different time relationships therebetween. This varying time relationship is generally referred to as "pattern sensitivity."

The varying time relationship between the information signals reduces the margin in the information recovery logic. Minimizing such variations allows additional margin for other timing variations in a system, such as those resulting from noise, circuit jitter and changes in the speed of the recording medium.

Generally in phase modulation systems, the read out signals are amplified, differentiated, again amplified and limited. The zero crossings of the resulting waveform correspond fairly accurately to the pulse peak locations and can easily be detected by low level zero cross detectors (Schmitt Trigger Circuits) which produce narrow pulses at each zero crossing. Usually there is one detector for zero crossings which correspond to "0's" and another detector for zero crossings which correspond to "1's." Pulses corresponding to non-significant peaks also appear and must be eliminated.

These non-significant pulses can be suppressed by means of an inhibit signal generated by the desired "1's" and "0's." The inhibit signal must last for approximately ¾ of the digit period in order to suppress the non-significant pulses and also allow for variations in timing caused by speed variations; noise, circuit jitter, pattern sensitivity and electronic tolerances.

It has been found that the various shifting of the phase relationships or pattern sensitivity is different for different groups of signals. For example, one group of signals may result in a distorted signal in which the phase is shifted in one direction, for example, causing one or more of the signals in the group to be recorded too early. Another group of signals may result in a shifting of the phase in the other direction, for example, causing one or more of the signals in the group to be recorded too late.

In accordance with the present invention, compensating means for shifting the time relationship of recorded information signals in selected groups of a series of information signals in a high density recording system is provided. Information signals are stored in a shift register. The stored information is then decoded to detect the pattern of the stored group of signals. One of the bits of the stored information signals is applied to a write circuit to write information onto a recording medium. Means are provided for delaying the application of the one bit of information to the write circuit, with the period of delay being dependent upon the value of its adjacent stored signals. The overall written signals are selectively shifted so as to provide read out signals of the proper phase relationship.

Figure 2:
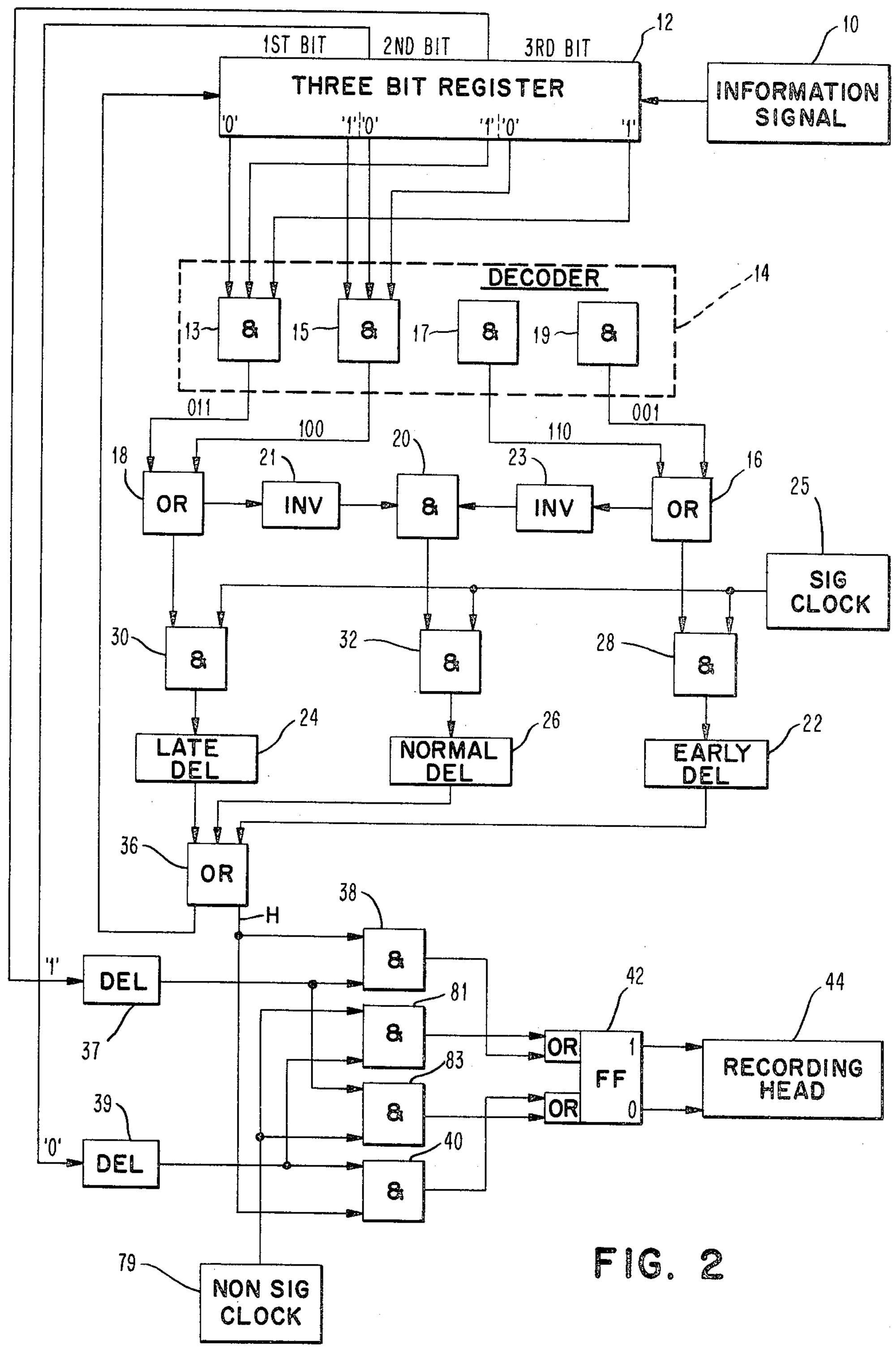

FIGURE 1 illustrates a series of waveforms, shown for the purpose of explanation, and FIGURE 2 is a block diagram generally illustrating a system, in accordance with the present invention.

Referring particularly to FIGURE 1, various types of waveforms are illustrated. FIGURE 1A illustrates a type of signal which may normally be recorded in a phase modulation system. FIGURE 1B illustrates an ideal signal which should be read back from the signal of FIGURE 1A. FIGURE 1C illustrate the actual signal which is read back from a recording medium in conventional phase modulation systems in which the signal of FIGURE 1A is recorded. It is noted that the phase relationship of the peaks of the signals of FIGURE 1C is different than the phase relationship of the peaks of the signals illustrated in FIGURE 1B. In an ideal situation, the peaks of the read-back signal should coincide with the zero cross-over points of the signals illustrated in FIGURE 1A. FIGURE 1D illustrates the type of signal which would be recorded with the present invention is used instead of the signal of FIGURE 1A. In FIGURES 1C and 1D "D" represents the total spread for phase shift of the signals involving double frequency, i.e., the signals including the non-significant signals. FIGURE 1E illustrates the read-out signal when the present invention is used, this signal being similar to the idealized waveform of FIGURE 1B.

The uncompensated signal illustrated in FIGURE 1C illustrates the timing difference between the idealized and actual read back signal for a complex pattern in a phase modulation magnetic recording system. For purposes of explanation, the information signals to be recorded may be "10110001." This recording system for example, may involve the recording of one thousand bits per inch and a frequency of 550 kilocycles.

In a phase modulation system, the information signals may involve two frequencies. One frequency would involve consecutive signals of different characteristics, i.e., a "1" followed by a "0," or vice versa. The second frequency involves consecutive similar information signals, i.e., two consecutive "1's" or "0's." The reason for the double frequency when consecutive similar signals are involved is that the signal must be returned to the opposite level between digit periods so that the zero crossings will be in the right direction. Because of the assymetrical flux distribution and the frequency response of the read back medium, the double frequency bits, i.e., bits written at time T3 and T4, and T5 and T6, involving consecutive similar bits tend to spread out. At the same time, the time between the change over bits, i.e., bits written at times T4 and T5, and T7 and T8, involving consecutive dissimilar bits, decreases by the same amount as the time between the double frequency bits increases. It is therefore seen that the timing of each bit depends upon the nature of the adjacent bits on each side when information is written. Therefore, if the adjacent bits are known, then the write signals may be adjusted so that the idealized read timing, illustrated in FIGURE 1B, may be realized.

In general, it may be said that if the write signal illustrated in FIGURE 1A could be shifted, or deliberately distorted from its normal phase relationship during the write operation, then it would be possible to obtain ideal read back signals.

The present invention involves receiving a train of information signals. The incoming signals are stored to determine the nature of the signals. For example, groups of three signals may be stored in a three bit shift register. Varying degrees of time delays may be employed to produce a compensated write signal, with the delay being determined by the nature of the stored three information signals.

FIGURE 1D illustrates a type of compensation write signal which may be used to produce the read back signal illustrated in FIGURE 1E, which is substantially the same as waveform 1B.

Referring particularly to FIGURE 2, information signals from a signal source 10 are applied to a three bit shift register 12. These signals, for example, may be pulse signals to actuate flip-flop circuits for storing information. The shift register 12 is capable of storing three consecutvie bits of information. The shift register may be shifted by the information pulses to be recorded or by other suitable means not shown. The stored bits of information from the shift register 12 are applied to a decoder circuit 14. The decoder circuit 14 detects the nature of the various combination of signals. The signals involving "001," "110," "100" and "011," are the signal patterns causing phase shift in conventional phase modulation read back circuits. Other signals, such as "010" and "101" do not cause any substantial change in the phase of the recorded signal.

Ideally, in order to provide compensation, the signals associated with group "010" or "101" not causing any phase shifts should be written without any time delays being involved. This would mean that the signals associated with groups "011" and "100" would have to be recorded later than the signals associated with groups "010" or "101" and the signals associated with groups "001" and "110" recorded earlier. However, as long as the proper relative time delays are provided among the different signal groups, delays for all the signal groups may be employed, with one delay being considered a normal time delay and the other delays being shorter and longer, respectively. A simple way of accomplishing this is to provide a delay for all signals with the delay provided for signals "010" and "101" being considered as a normal delay. The signals "011" and "100" would have a longer delay than the normal delay and the signals "001" and "110" would have a shorter delay.

The three bit register 12 may comprise three flip-flop circuits, for example. Each of these flip-flop circuits may have a "0" and a "1" output as indicated. Specific details of the flip-flop circuits involved are not illustrated since such flip-flop circuits in shift registers are known to those skilled in the art. The various "0" and "1" outputs from the three bit register 12 are applied to the decoder 14. The actual stepping of the shift register may be accomplished by input stepping signals (not illustrated) each time a signal is recorded.

The main decoder 14 may include a plurality of decoder circuits 13, 15, 17 and 19. These decoder circuits may, for example, be simple AND gate circuits. The decoder 13 will produce an output signal when "0" output at the first bit is high and the "1" outputs at the second and third bits are high. When these three signals are present, an output signal will be applied from the AND gate 13 to the OR gate 18.

In a similar manner, the decoder 15 detects a condition at the register 12 in which the "1" output of the first bit is high and the "0" outputs of the second and third bits are high. Under these conditions, an output signal is developed by the decoder 15 and applied to the OR gate 18.

The decoders 17 and 19 are connected to the three bit register 12 in a manner similar to that of the decoders 13 and 15. For purposes of clarity, the various lines connecting the decoders 17 and 19 to the register 12 are not shown. However, it is understood that the decoder 17 will provide an output signal when a signal condition "110" is present. The decoder 19 will produce an output signal when the signal condition "001" is present. The output signals from the decoders 17 and 19 are applied to an OR gate 16.

The output signal from the OR gate 18 is applied through an inverter circuit 21 to an AND gate circuit 20. Likewise, the output signal from the OR gate 16 is applied through an inverter 23 to the AND gate circuit 20. The inverters 21 and 23 invert the signals applied thereto. In other words, the output signals from the inverters 21 and 23 represent the complements of the input signals to the OR gates 18 and 16, respectively.

An output signal will be developed at the output circuit of the AND gate 20 when none of the combinations of signals "011," "100," "001" and "110" are stored in the shift register 12. The presence of an output signal from AND gate circuit 20 signifies that the signals may be regarded as normal signals and therefore subjected to the normal time delays.

The output signals from the OR gate circuits 16, 18 and 20 are applied to AND gate circuits 28, 30 and 32, respectively. Clock signals are also applied to these AND gate circuits from a source of clock signals 25. These clock signals may be clock signals for determining the timing of the information signals to be recorded. As will be seen, additional clock signals, to be generated between digit periods may also be necessary, the latter being considered as non-significant clock signals occurring in the middle of the digit periods.

The output signals from the AND gate circuits 28, 30 and 32 are applied to the delay circuits 22, 24 and 26, respectively. If the output signal from the delay circuit 26 is considered to be the signal representing a group of signals normally not causing a phase shift, then the delay intrdouced by the delay circuit 26 will be related to the delay introduced by the delay circuits 22 and 24. A lesser amount of delay will be introduced in the delay circuit 22 because of the nature of the signals "110" and "001." To adjust for these signals, it is necessary that the second information bit in the group be recorded earlier than the second bits of the normal signals.

For the signals "011" and "100," it is desired that the delay introduced by the delay circuit 24 be greater than the delay introduced by the delay circuit 26. The reason for this is that the nature of the signals "011" and "100" is such that they should be recorded earlier than the signals normally not causing a phase shift in the recorded signal.

Thus, it may be said that the output signals from the delay circuit 26 may be signals such as "010" or "101" which do not require compensation. The output signals from the delay circuit 22 are delayed shorter than the signals not requiring compensation and the output signals from the circuit 24 are delayed for longer periods of time than the signals not requiring compensation.

The output signals from the delay circuits 22, 24 and 26 are applied to an OR gate circuit 36. The output signals H from the OR gate circuit 36 are applied to a pair of AND gate circuits 38 and 40.

The output signals from a flip-flop within the shift register 12, representing the second bits of stored information, are also applied to the AND gate circuits 38 and 40 through the delay elements 37 and 39. Signals representing "1" bits of information are applied to the AND gate circuit 38. Signals representing "0" bits of information are applied to the AND gate circuit 40. Thus, an output signal will be developed at one of the AND gate circuits 38 or 40 dependent upon the second information signal stored in the shift register 12. The output signal H from the OR gate 36 provides a gating signal for the AND gates 38 and 40.

The H signal emerges from the OR gate 36 in response to the application of a significant clock signal from element 25. However, the significant clock signal is delayed by the elements 22, 24 and 26. Hence, the input signals to OR gate 36 occur after the significant clock signal has been terminated. It follows then that if the register 12 is shifted in response to an H signal (via the feedback line from OR gate 36 to shift register 12) the new output signals therefrom (i.e., from the information shifted) will only be transmitted as far as the gates 28, 30 and 32 and will have no further effect at that time since they must wait for the arrival of the next significant clock signal. It becomes apparent then that no wrong information can be transmitted to the flip-flop 42 in response to the shifting of the register 12.

The delay elements 37 and 39 are of sufficiently short duration that they are less than the early delay 22, but are longer than the width of the significant clock signal. If we assume that information is in the register 12 and has been there for some period of time then at least one of the delays 37 or 39 is providing an output signal to the respective AND gates 38 and 83 or 40 and 81. When the H signal is generated a pulse passes through either gate 38 or 40 and the flip-flop 42 is properly transferred to store the significance of the signal coming through either the delay 37 or 39. Immediately (in response to the H signal) thereupon the register 12 is shifted and new information is transmitted to the delay elements 37 and 39. However, since the delay elements 37 and 39 are for a longer period than the significant clock signal, the information cannot be transmitted from the delays in time to interfere with the H signal which just caused the shift of the register. Moreover, before the next significant clock signal is generated to ultimately produce a new H signal a non-significant clock pulse is generated. One of the delays 37 or 39 permits one of the new signals, i.e., the signals from the information just shifted, to be applied to the gates 81 and 83 before the non-significant clock signal arrives. Hence, when the non-significant signal arrives, one or the other of the gates 83 or 81 is energized to transfer the flip-flop 42 or to not transfer the flip-flop as the case may be. Now when the non-significant clock has been terminated the new signals from the delay elements 37 and 39 continue to be applied to the gates 38 and 40. Hence, when the second significant clock signal is generated and transmitted to the gates 28, 30 and 32 the conditions provided by the new middle bit, i.e., after the register has been shifted, will be present and the proper one of these last mentioned AND gates will provide a signal to the delay elements 22, 24 and 26. When the new H signal is generated it is transmitted through either gate 38 or 40 and once again the flip-flop 42 is transferred to its proper side for a write operation. At the same time the second H signal will shift the register 12 a second time but the new information does not arrive at the outputs of the delays 37 and 38 in time to disturb the H signal which has shifted the bit register.

The output signals from the AND gates 38 and 40 are applied to a flip-flop circuit 42. The output signal from the flip-flop circuit 42, which may be in a form as illustrated in FIGURE 1D, is used to apply a write current to a recording head 44.

In a phase modulation system, when two consecutive bits of information are of the same characteristic, i.e., two consecutive "1's" or two consecutive "0's," it is necessary to switch or return the signal level of the flip-flop circuit 42 between information signals. If two consecutive "1's" are to be written by an output signal from the flip-flop circuit 42, the flip-flop circuit 32 must be re-set in-between digit periods so that the information recorded will move through zero in the right direction to signify the proper information. A source of non-significant clock signals 79 is provided for this purpose.

The clock signals from the source 79 may be a series of pulses occurring in the middle of the digit periods between the clock signals produced by the source 25. The output clock signals from the source 79 are applied to a pair of AND gates 81 and 83. The "1" output from the register 12 is also applied to the AND gate 83. The "0" output of the second bit from the register 12 is applied to the AND gate 81. The non-significant clock signals from the source 79 will be steered through either one of the AND gates 81 or 83, dependent upon the other input signal applied to the AND gates. For example, if the "1" output of the second bit from the register 12 is high, the non-significant clock signal will be applied to the "0" side of flip-flop circuit 42. This signal will re-set the flip-flop circuit 42 if the previous signal has set the flip-flop to a "1" output. If the previous signal was a "0," then the signal from the AND gate 83 will have no effect on the flip-flop circuit 42.

The AND gate circuit 83 operates in substantially the same manner as the AND gate circuit 82. The non-significant clock signals from the source 79 will either re-set the operating state of the flip-flop 42 or maintain it in the same operating condition, dependent upon the previous signal applied to the flip-flop 42 from the register 12.

Referring to FIGURE 1, waveforms are shown to illustrate the operation of the various AND gate circuits 38, 40, 81 and 83.

Waveform F represents the record bit of information stored in the register 12. Waveform G represents the non-significant clock signals and waveform H represents the significant clock signals. Waveform I represents the information to be written onto the recording medium by the output signals from flip-flop 42.

As previously mentioned the shift register may be stepped by suitable means, for example, by output signals from the OR gate 36, which generates a compensated information signal each digit period. Detailed means for stepping shift registers are well known to those skilled in the art.

The significant clock signals and the information signals from the shift register gates one or the other of the AND gate circuits 38 or 40 dependent upon whether the second information bit stored in the shift register is a "1" or a "0."

The non-significant clock signals and the information signals from the shift register 12 gates one or the other of the AND gate circuits 81 or 83 dependent upon whether the second information bit stored in the shift register is a "1" or a "0."

It is noted that the non-significant clock signals occur one half a digit period after the significant clock signals and involves the next subsequent information signal to the one gated by the previous significant clock signal.

When the information signal gated by a non-significant clock signal is different than the information signal previously gated by the significant clock signal, the flip-flop circuit 42 will not switch operating states. On the other hand, if the information gated by the non-significant clock signal is the same as the information signal previously gated by a significant clock signal, the flip-flop 42 will switch operating states.

The embodiments of the invention in which an exclusive property or privilege is claimed are defined as follows:

1. Circuitry means for use with a circuit to write information in magnetic form comprising shift register means for storing first, second and third information signals, decoding means connected to said shift register for decoding said stored information to detect the patterns of said first, second and third signals, magnetic write means, a plurality of gate circuit means connected to said magnetic write means, a plurality of signal delay means connected between said gate circuit means and said decoding means, timing signal means connected to said delay circuits to time the input signals thereto, transmission circuitry means connected between said shift register means and said gate circuit means to cause said second information signals to be transferred from said shift register means to said gate circuit means in order to transmit signals therethrough to said magnetic write means in response to the output from said signal delay means, and signal feedback means connected from the output of said signal delay means to said shift register means to cause said information to be shifted therein in response to an output from said signal delay means.

2. In a phase modulation system for magnetically recording information on a record medium with said information being recorded by changing the magnetic state of said record medium at least once each digit period, a circuit for use with a magnetic write circuit for shifting the phase relationship of information signals in a group of information signals comprising a shift register for storing first, second and third information signals, decoding means connected to said shift register for decoding information stored therein to detect the pattern of said first, second and third signals, a magnetic write circuit, a plurality of delay circuits connected to said decoding means for delaying the application of said second information signals to said magnetic write circuit with the periods of delay applied to said second information signal being respectively a normal delay, a longer than normal delay or a shorter than normal delay dependent upon the pattern of said first, second and third information signals of said group of information signals stored in said shift register, a first source of timing signals connected to said delay circuits to determine the time that said second information signal is transferred from said shift register, a second source of timing signals connected between said delay circuits and said magnetic write circuit to switch the magnetic state of said record medium between digit periods whenever two consecutive information signals are of the same characteristic, said second source of timing signals being ineffective on said recording medium when two consecutive information signals are of different characteristics, and a feedback circuit connected from the output of said delay circuits to said shift register to shift information therein response to an output signal from said delay circuits.

3. The invention set forth in claim 2 wherein said information signals are of a binary nature and where the delay circuit effective on information signals 000, 010, 101 and 111 is said normal delay, and wherein the delay circuit effective on information signals 011 and 100 is said shorter than normal delay, and wherein the delay circuit effective on information signals 001 and 110 is said longer than normal delay.

References Cited

UNITED STATES PATENTS

| | | | |
|---|---|---|---|
| 3,067,422 | 12/1962 | Hunt | 346—74 |
| 3,345,638 | 10/1967 | Christol | 346—74 |

STANLEY M. URYNOWICZ, Jr., Primary Examiner

WILLIAM F. WHITE, Assistant Examiner

U.S. Cl. X.R.

346—74